United States Patent [19]

Whitehouse et al.

[11] 4,196,448
[45] Apr. 1, 1980

[54] TV BANDWIDTH REDUCTION SYSTEM USING A HYBRID DISCRETE COSINE DPCM

[75] Inventors: Harper J. Whitehouse, San Diego, Calif.; Robert W. Means, Lausanne, Switzerland; Edwin H. Wrench, Jr.; Jeffrey M. Speiser, both of San Diego, Calif.; Allan G. Weber, Los Angeles, Calif.

[73] Assignee: The United States of America as represented by the Secretary of the Navy, Washington, D.C.

[21] Appl. No.: 905,902

[22] Filed: May 15, 1978

[51] Int. Cl.² .............................................. H04N 7/12
[52] U.S. Cl. ................................... 358/135; 364/725; 358/260; 375/28
[58] Field of Search ............... 358/136, 135, 133, 260, 358/13; 325/38 B; 340/347 AD, 347 DA; 364/725, 726, 727

[56] References Cited

U.S. PATENT DOCUMENTS

| | | | |
|---|---|---|---|
| 3,920,974 | 11/1975 | Means | 364/725 |
| 4,152,772 | 5/1979 | Speiser et al. | 364/725 |

OTHER PUBLICATIONS

A. Habibi, "Hybrid Coding of Pictorial Data" ARPA Quarterly Report, 6-1-73-10-1-73, pp. 34-75.
W. H. Chen et al., "A Fast Computational Algorithm for the Discrete Cosine Transform" 9-77, I.E.E.E. vol. com-25, No. 9 pp. 1004-1009.
R. Means, et al. "Television Encoding Using a Hybrid Discrete Cosine Transform and a Differential P.C.M. in Real Time" I.E.E.E., 1974 pp. NTC 74-61-66, Naval Undersea Center S.D. 92, 132.

W. F. Schreiber, "Picture Coding" I.E.E.E. vol. 55, No. 3, 3-67 pp. 320-330.
D. J. Connor, et al. "Intraframe Coding for Picture Transmission" I.E.E.E., vol. 60, No. 7, Jul. 19 72 pp. 779-791.
Habibi et al. "Real Time Image Redundancy Reduction Using Transform Coding Techniques" ARPA Quaterly Tech. Report 10-1-73, 1-8-74.
D. D. Buss et al. "Charge Transfer Device Development" ARPA Quarterly Tech. Report, 1-1-75, 12-3-1-75, pp. 1-64.
J. Speiser "High Speed Serial Access Implementation for Discrete Cosine Transforms" ARPA Tech. Report 10-1-73/ 1-8-74.

Primary Examiner—Robert L. Griffin
Assistant Examiner—Edward L. Coles
Attorney, Agent, or Firm—Richard S. Sciascia; Ervin F. Johnston; John Stan

[57] ABSTRACT

An image-compression system, wherein the image consists of a planar array of data points having various brightness levels, comprises a transmitter and a receiver. The transmitter comprises an analog-digital converter, for converting input analog data into digital data. The cosine transform is taken of the incoming digital data to transform the data representing various brightness levels into the frequency domain. The various frequency data points are differentially pulse code modulated, thereby removing line-to-line redundancy, the output data being in parallel form. Timing circuitry is provided for controlling the timing of the various circuits. Circuitry is provided in a receiver for the modulating or decoding of the output signal of the transmitter.

12 Claims, 11 Drawing Figures

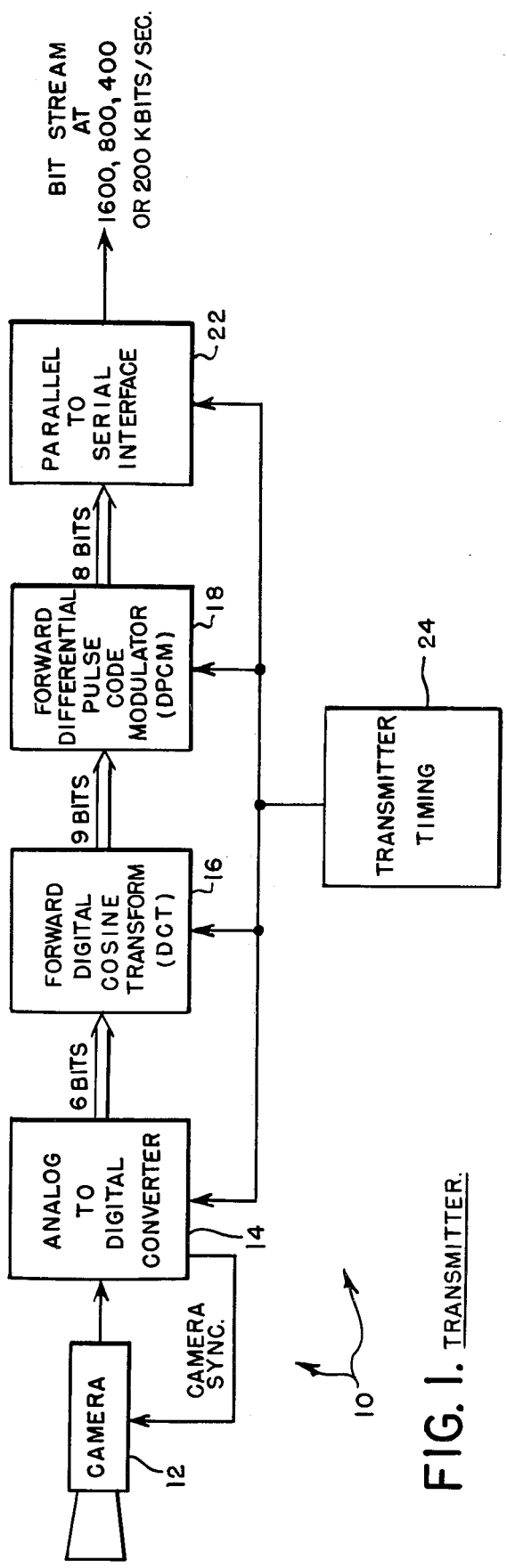
FIG. 1. TRANSMITTER.
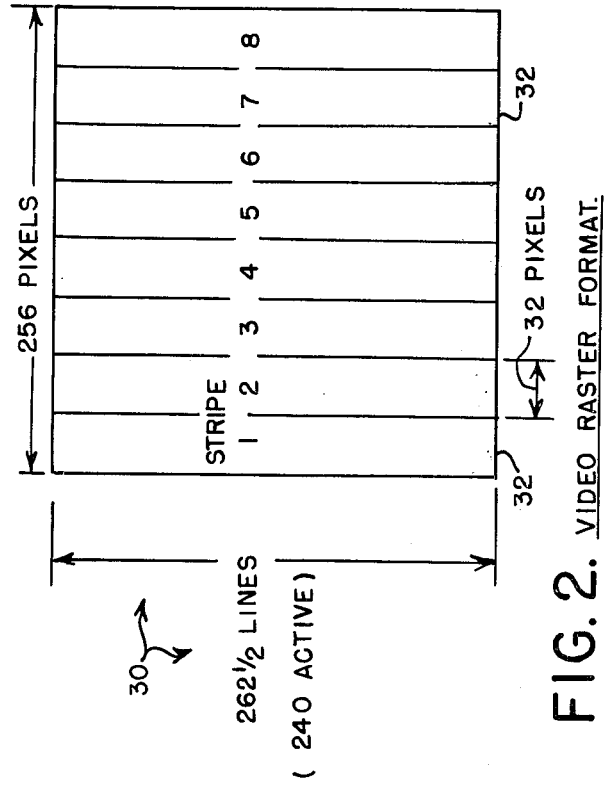
FIG. 2. VIDEO RASTER FORMAT.

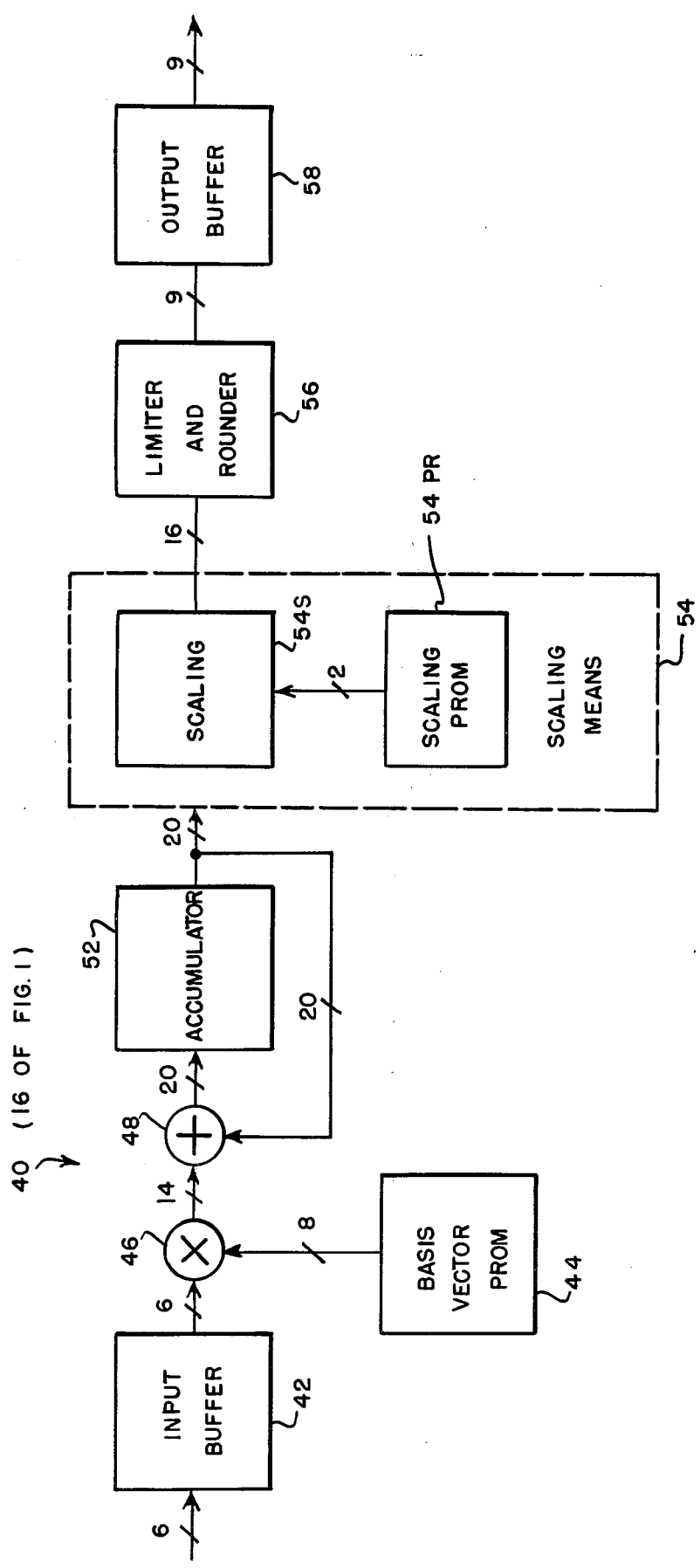
FIG. 3. FORWARD DIGITAL COSINE TRANSFORM (DCT) CIRCUIT.

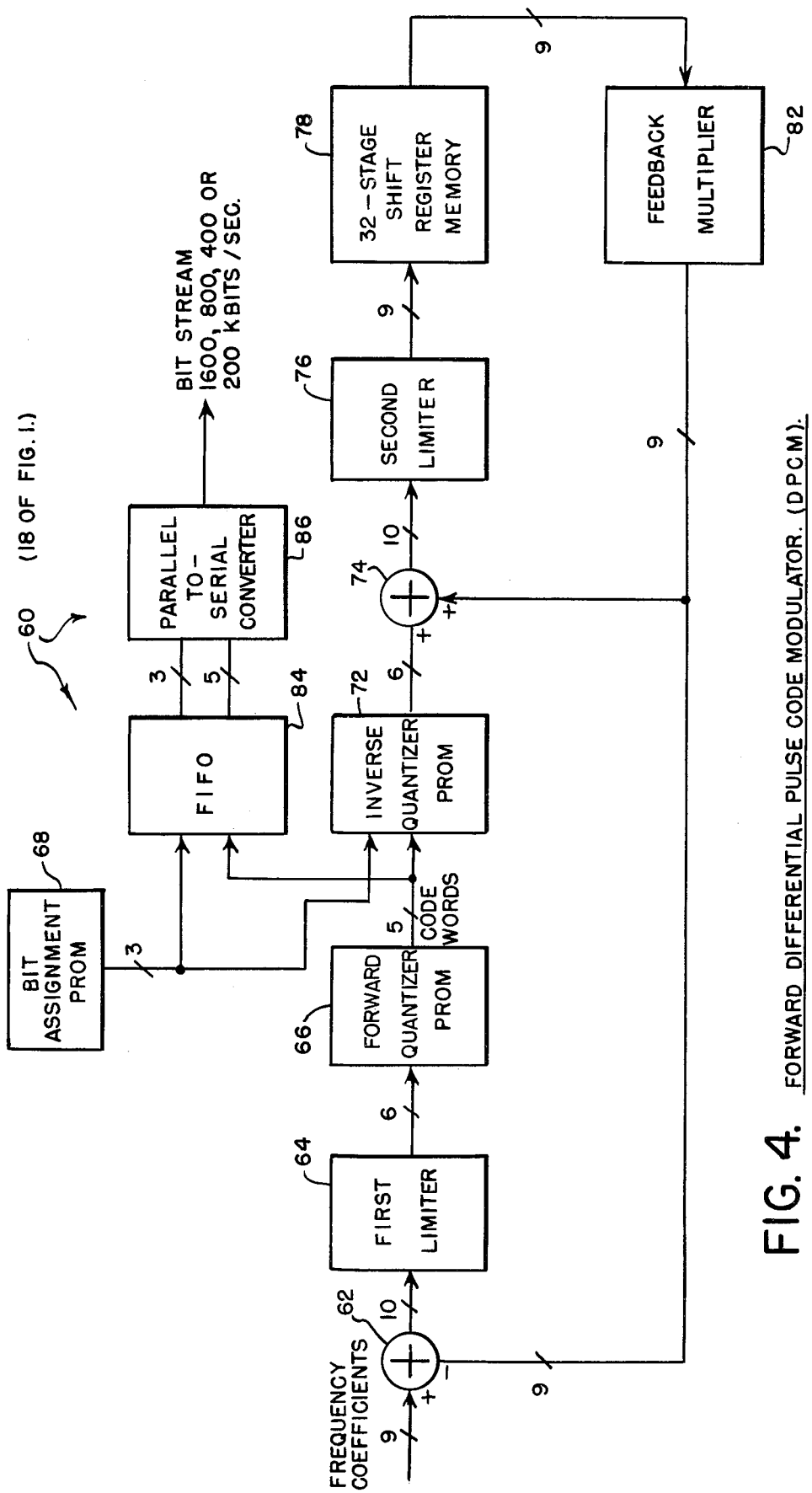
FIG. 4. FORWARD DIFFERENTIAL PULSE CODE MODULATOR. (DPCM).

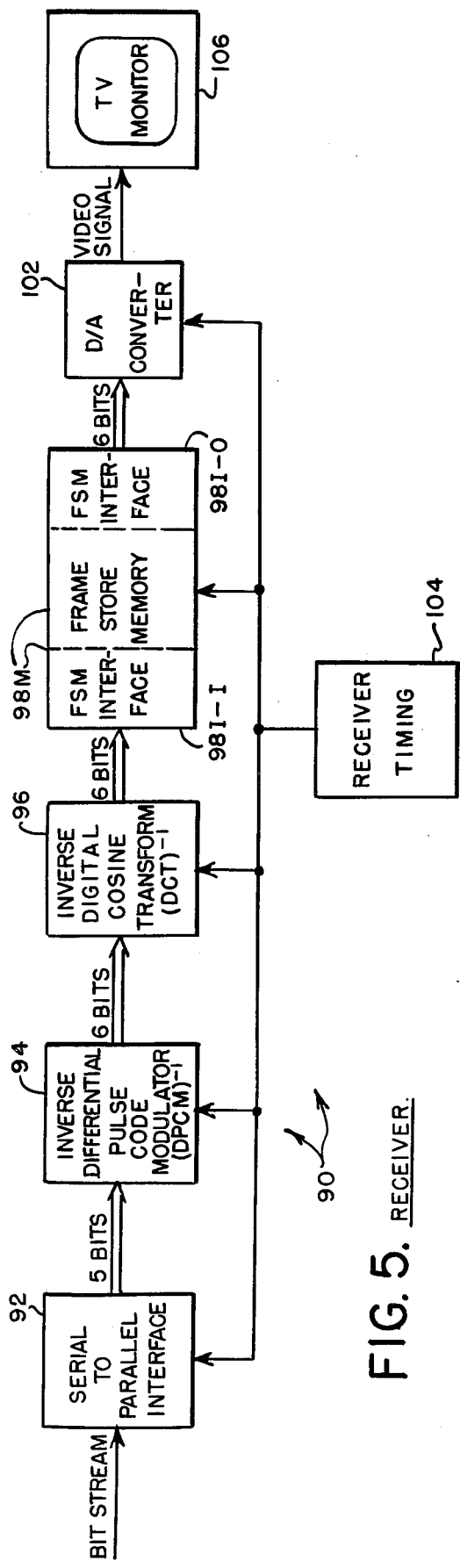
FIG. 5. RECEIVER.
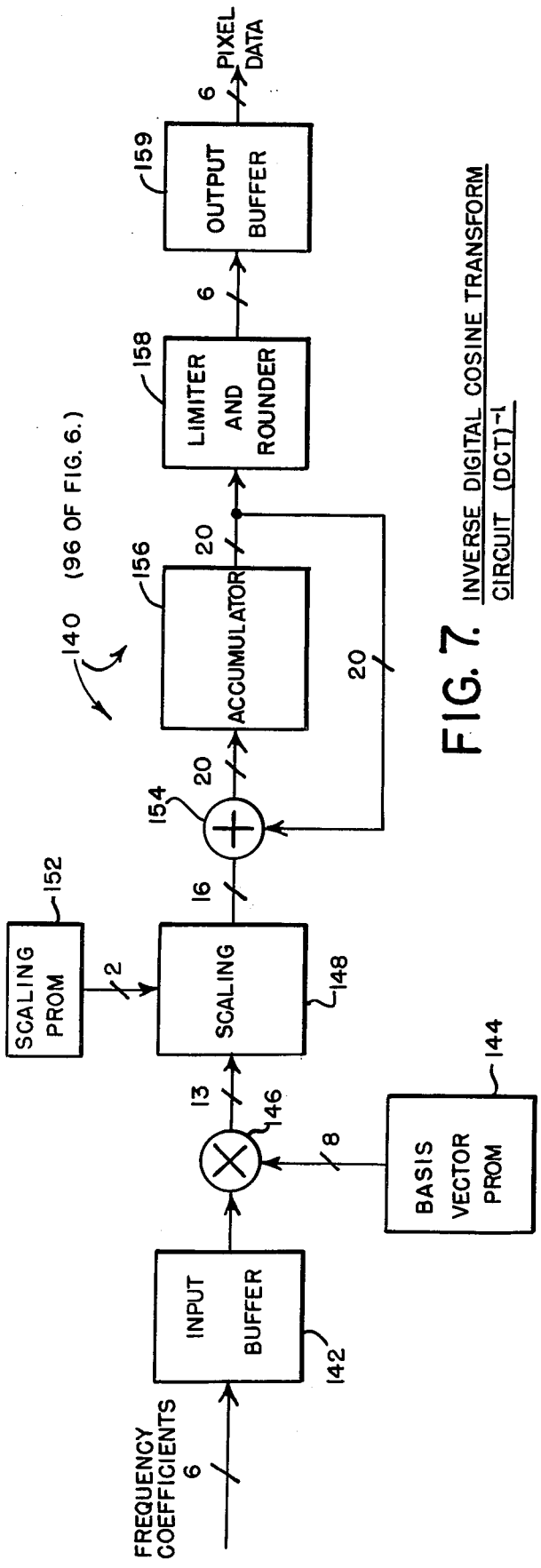
FIG. 7. INVERSE DIGITAL COSINE TRANSFORM CIRCUIT (DCT)⁻¹

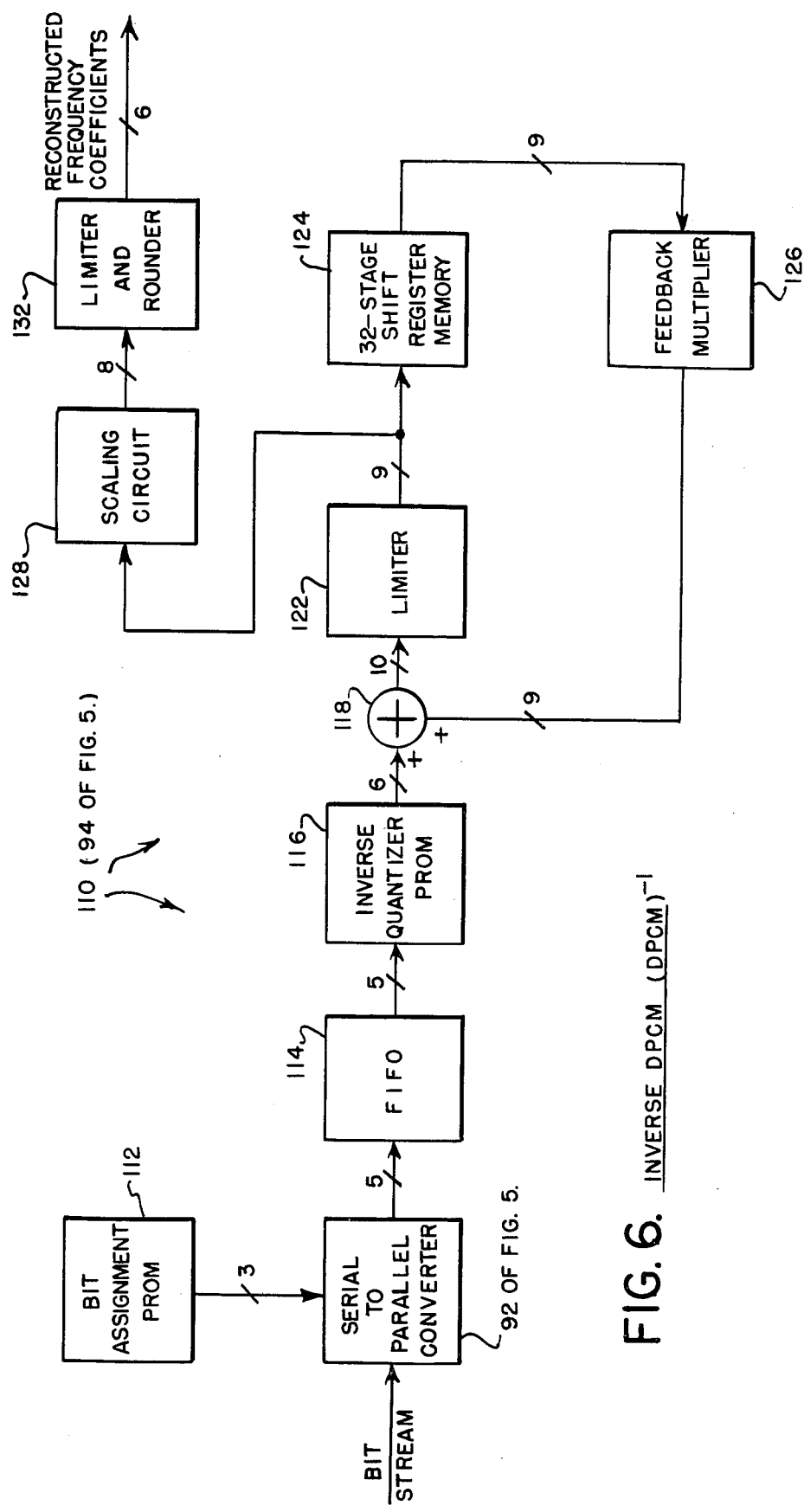
FIG. 6. INVERSE DPCM (DPCM)⁻¹

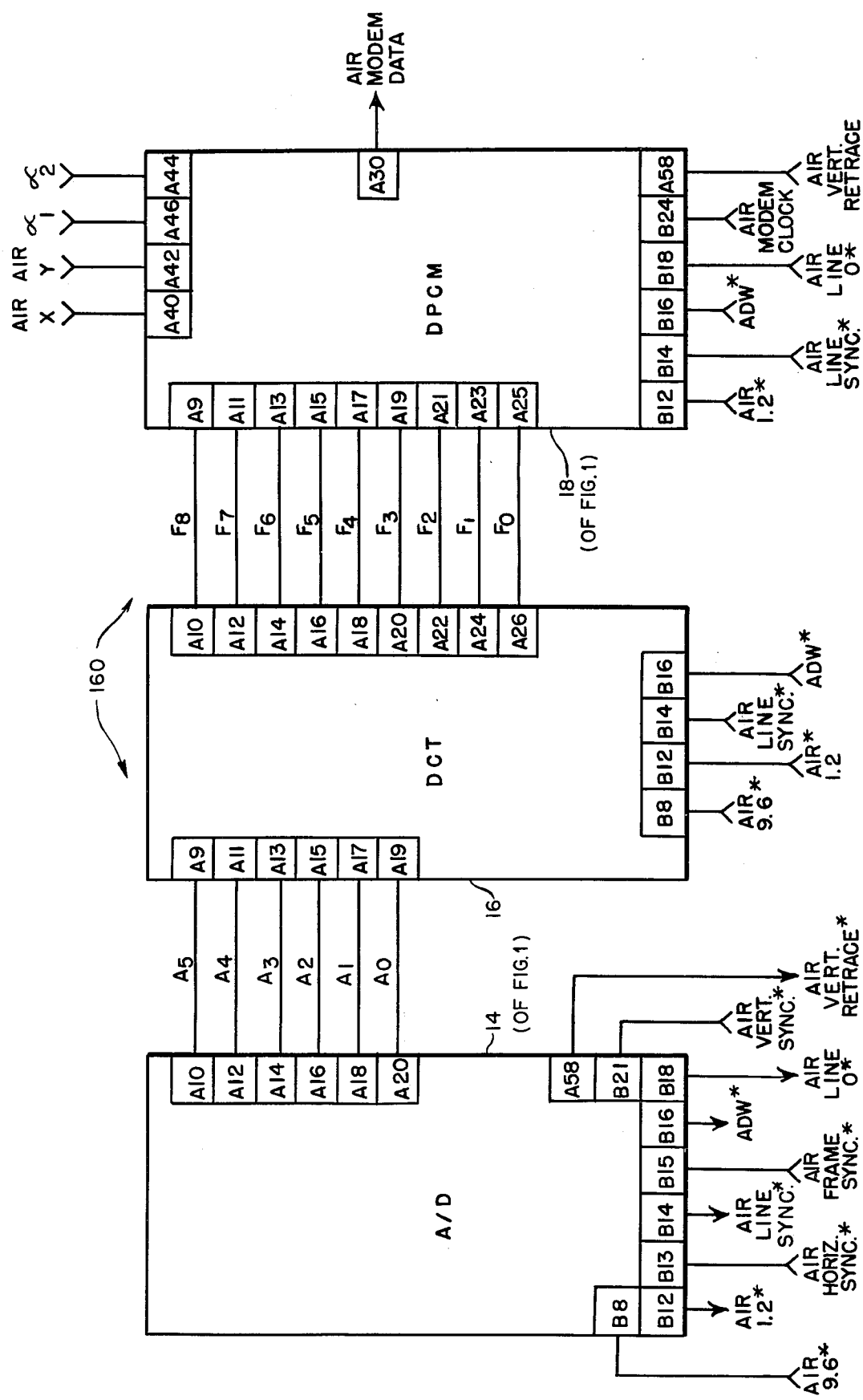
FIG. 8. SYSTEM INTERCONNECTIONS: TRANSMITTER (AIR).

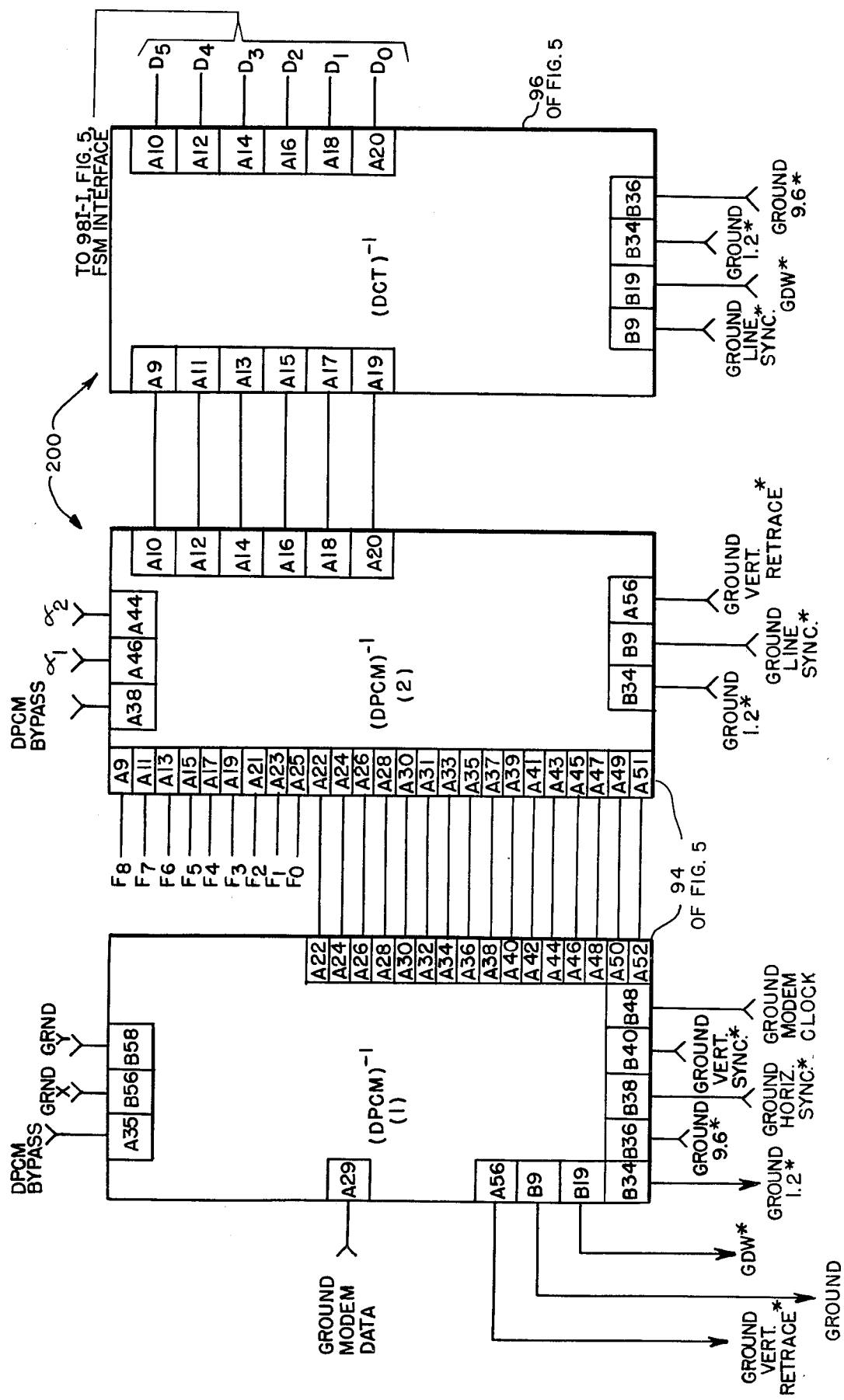
FIG. 9. SYSTEM INTERCONNECTIONS: RECEIVER (GROUND).

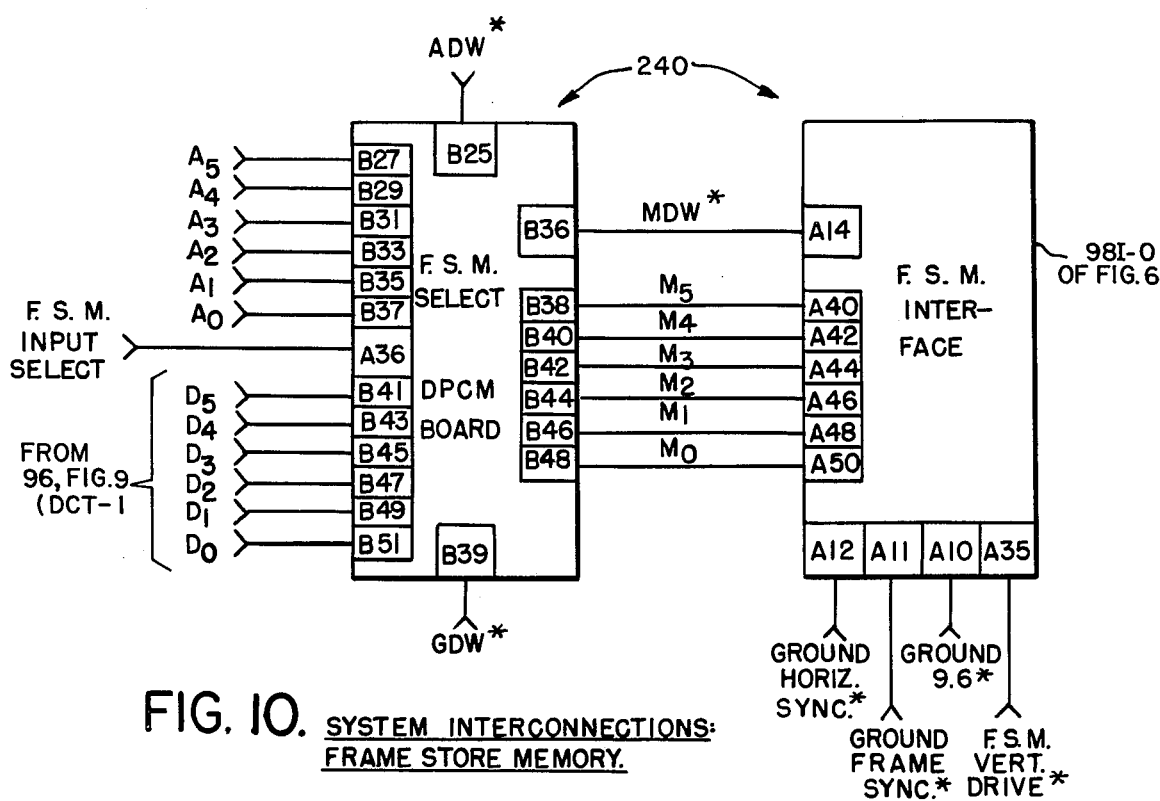
FIG. 10. SYSTEM INTERCONNECTIONS: FRAME STORE MEMORY.
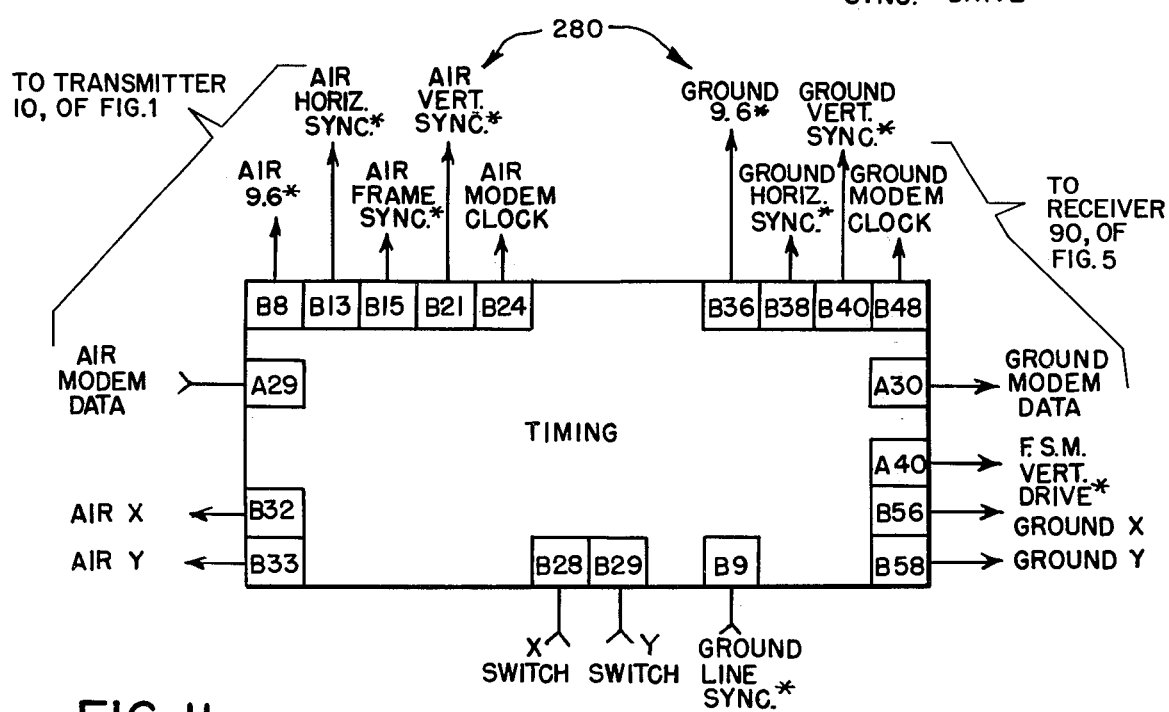
FIG. 11. SYSTEM INTERCONNECTIONS: TIMING FOR RECEIVER AND TRANSMITTER.

TV BANDWIDTH REDUCTION SYSTEM USING A HYBRID DISCRETE COSINE DPCM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to a TV bandwidth reduction system using a hybrid discrete cosine transformer (DCT) and a differential pulse modulator (DPCM). Two-dimensional video pictures are involved, which requires, in this system, two-dimensional data fields. Two-dimensional transforms are taken of data points, a discrete cosine transform (DCT) followed by differential pulse code modulation (DPCM) in the vertical direction, Hence, the term "hybrid". It has been determined that using a hybrid transform of this type gives optimal results.

It has been shown that a significant bandwidth reduction can be achieved in many applications of transform coding techniques with minimal image degradation and relative tolerance to channel errors. In transform coding systems, a one-or-two-dimensional mathematical transform of an image line segment or block is performed at the coder. The transform coefficients are then quantized and coded. At the receiver, after decoding, an inverse transform is taken to obtain an image reconstruction.

Transforms that have proven useful include the Fourier, Hadamard, Slant S, Cosine, and Karhuen-Loeve transforms. A big rate reduction is obtained by efficient quantization and coding of the transform coefficients. Many of the transform coefficients of a natural image are of relatively low magnitude and can be discarded entirely, or coded with a small number of bits per coefficient while maintaining a small mean square error.

General background information on DPCM systems may be obtained from an article by W. F. Schreiber in the March 1967 issue of Proc. IEEE, pp. 320-330.

In a DPCM system, such as the system of this invention, the value of a scanned image sample is predicted and the difference between the actual and the predicted value is quantized and transmitted. At the receiver a similar predictor uses transmitted values of the quantized differential signal to reconstruct a replica of the scanned image. Prediction of a data point is performed by using a number of adjacent previously scanned sample values or the parameters of the predictor are specified in terms of the correlation of picture elements. This type of treatment is covered in detail by D. J. Conner et al in an article entitled "Intraframe Coding for Picture Transmission", which appears in the Proc. IEEE, July 1972, pp. 779-791.

Properties of the differential signal that make a DPCM system attractive are a significant reduction in the variance of the differential signal, as compared to the variance of the original sample, and the fact that the probability density function of the differential signal is closely approximated by an exponential function. The former property results in a smaller quantization noise power, while the latter property allows for designing an optimum quantizer to obtain a further reduction of noise power.

Very useful general background information with respect to coding techniques may be obtained from the article entitled "Real Time Image Redundancy Reduction Using Transform Coding Techniques", by Ali Habibi et al, which appeared in the ARPA Quarterly Technical Report, Oct. 1, 1973–Jan. 8, 1974, published by the Naval Undersea Center, San Diego, California 92132.

The system of this invention offers a differential pulse code modulator with non-linear quantization levels for the read-only memories.

SUMMARY OF THE INVENTION

An image-compression system comprises a transmitter and a receiver. The image consists of a planar array, generally rectangular, of data points having various brightness levels. The transmitter comprises means for converting input analog data into digital data. Means, whose input is connected to the output of the analog-to-digital (A/D) converting means, take the cosine transform of the incoming digital data, which are in the time domain, to transform the data representing the various brightness levels into the frequency domain.

A differential pulse code modulator (DPCM), whose input is connected to the output of the cosine transform means, modulates the input signal, thereby removing line-to-line redundancy. At this point the output data is in parallel form.

A timer is connected to the aforedescribed circuits, for controlling the timing of the circuits.

OBJECTS OF THE INVENTION

An object of the invention is to provide an image compression system which samples incoming video data and encodes it in such a way as to reduce the bandwidth necessary for transmission to a receiver.

Another object of the invention is to provide such a system which operates at real-time video rates.

Yet another object of the invention is to provide such a system which uses pre-frequency and post-frequency emphasis and de-emphasis to improve signal-to-noise ratio.

These and other objects of the invention will become more readily apparent from the ensuing specification taken together with the drawings.

BRIEF DESCRIPTION OF THE DRAWINGS

FIG. 1 is a block diagram of the transmitter.

FIG. 2 is a diagram showing the video raster format.

FIG. 3 is a block diagram showing the apparatus required to perform the forward discrete cosine transform (DCT). The term "forward" is used in contrast to the term "inverse".

FIG. 4 is a block diagram of the forward differential pulse code modulator (DPCM).

FIG. 5 is a block diagram showing the components of the receiver.

FIG. 6 is a block diagram of the inverse digital pulse code modulator $(DPCM)^{-1}$.

FIG. 7 is a block diagram of the components for performing the inverse discrete cosine transform $(DCT)^{-1}$.

FIG. 8 is a schematic diagram showing the system interconnections of the transmitter.

FIG. 9 is a schematic diagram showing the system interconnections of the receiver.

FIG. 10 is a schematic diagram showing the system interconnections of the frame store memory.

FIG. 11 is a schematic diagram showing the system interconnections of the timing circuitry for the receiver and transmitter.

DESCRIPTION OF THE PREFERRED EMBODIMENTS

The image-compression system of this invention comprises a transmitter and a receiver.

Referring now to FIG. 1, there is shown the transmitter 10 of the image-compression system. A camera 12 takes a picture of the image, which consists of a planar array of data points having various brightness levels. Means 14, whose input is connected to the output of the camera 12, convert the input analog data from the camera into digital data.

Means 16, whose input is connected to the output of the analog-to-digital (A/D) converting means 14, take the cosine transform of the incoming digital data representing the various brightness levels of the image, and transform the data into the frequency domain. The original data points were taken in the time domain. The cosine transform is taken of image points in successive horizontal lines, from top to bottom, exactly as in scanning a TV picture.

Means 18, whose input is connected to the output of the cosine transform means 16, differentially pulse code modulate (DPCM) the input data, thereby removing line-to-line redundancy. The differential pulse code modulation is done in the vertical direction. The differential pulse code modulator is so constructed that the output data is in parallel form.

Means 22, whose input is connected to the output of the DPCM means 18, convert the parallel output data into serial output data.

A timing means 24 controls the timing of the various means, 14, 16, 18, and 22.

The transmitter 10 samples the incoming video data and encodes it in such a way as to reduce the bandwidth required for transmission to the receiver. To achieve this goal, three different techniques are used.

Reference is now directed to the video raster format 30 shown in FIG. 2. First, the frame rate is reduced by a factor of eight by dividing the picture into eight vertical stripes 32, and only using one of these stripes from each successive field. That is to say, an entire horizontal line, traversing eight stripes, is scanned but only that data from the stripe 32 which is of interest at that moment is retained. During one field only stripe 1 is used. During the next field only stripe 2 is used and so forth across the picture until stripe 8 is used. The process then starts repeating with stripe 1, stripe 2, etc. This slows down the field rate from 60 fields per second to 7.5 fields per second. Since each stripe 32 contains only the information from one of the two fields, the vertical resolution is reduced by a factor of two, from 525 lines to 262.5 lines, of which about 240 lines are active.

The second method of data reduction results from the fact that each line in the stripe is sampled only 32 times, giving a horizontal resolution of only 256 picture elements, or pixels, across the screen.

The third method reduces redundancy in the data through the use of a discrete cosine transform (DCT) device 16 of FIG. 1, to transform the data into the frequency domain. The frequency coefficients then pass through a DPCM unit 18 to remove redundancy from line-to-line. The combination of the DCT device 16 in the horizontal direction and the DPCM unit 18 in the vertical direction allows a reduction in data rate from six bits per pixel down to as low as 0.4 bits per pixel.

Referring now to FIG. 3, therein is shown an apparatus 40 for taking the cosine transform of a digital signal. The bit stream from the output of the analog to digital converter 14, shown in FIG. 1, enters an input buffer 42. A programmable read only memory (PROM) 44 generates basis vectors. A multiplier 46 has as inputs the outputs of the storing means 42 and of the means for generating basis vectors 44.

A means for summing 48 has two inputs, one input being the output of the multiplying means 46. A means 52, whose input is connected to the output of the summing means 48, accumulates a series of digital numbers, the output of accumulating means forming the second input to the summing means 48.

A means 54, whose input is connected to the output of the accumulator 52, scales the values of some of the digital numbers.

A means 56, whose input is connected to the output of the scaling means 54, limits the values of the input digital numbers.

An output buffer 58, whose input is connected to the output of the limiter and rounder 56, stores the resultant transformed digital numbers.

Discussing now the theory of operation of the DCT device 40 shown in FIG. 3, each video line is sampled as it comes from the video camera, and the pixels are converted to a six-bit digital word at a 4.8 MHz rate and stored in the input buffer 42. The 32 digitized brightness levels are read out of the buffer 42 at a 1.2 MHz rate. The numbers at the inputs and outputs of the various components of the DCT device 40 indicate the number of bits in the digital word at that point. The words are in two's complement notation giving a range of $-32$ (darkest) to $+31$ (brightness). These 32 words are then stored in the buffer 42 in preparation for their being processed during the next line time.

The forward cosine transform unit 40, shown in FIG. 3, has been implemented using a matrix multiply algorithm, rather than by implementing a fast Fourier transform (FFT). The basis vectors, generated by the means for generating vectors 44, have been calculated to eight-bit accuracy and stored in programmable read-only memory (PROM) 44.

The basis vectors and the pixel data vectors are multiplied together, using high speed Schottky large-scale integrated (LSI) multiplier 46, and the result accumulated in register 52.

Due to the short time available for performing the transform, 65 microseconds, only the first 19 of the 32 coefficients are calculated and stored. The coefficients are calculated to 20-bit accuracy, but only nine bits are used by the succeeding hardware.

Since the magnitude of the coefficients is much higher for the d-c and low-frequency coefficients than it is for the higher frequency coefficients, it is desirable to scale these higher frequency coefficients upwards in order to make their dynamic range closer to nine bits, in order to maintain their accuracy. Therefore, before the coefficients are stored in the output buffer 58, they pass through a series of shifters 54 to shift them either 0, 1, 2, or 3 places. This is equivalent to multiplying them by a factor of 1, 2, 4, or 8.

The selection of how much to shift is controlled by a programmable read-only memory 54 PR. The selection of the scale factors, by scaling circuit 54 S, was determined by computer simulation and is designed to produce DCT coefficient values that are matched to the quantization levels in the differential pulse code modulator 60, to be described hereinbelow with reference to FIG. 4. A table of scale factors is shown in TABLE 1-1.

TABLE 1-1.

| Forward Cosine Transform Output Scaling | | | |
|---|---|---|---|
| Coef. No. | Scaling | Coef. No. | Scaling |
| 0 | 1 | 10 | 2 |
| 1 | 1 | 11 | 2 |
| 2 | 1 | 12 | 4 |
| 3 | 1 | 13 | 4 |
| 4 | 1 | 14 | 4 |
| 5 | 2 | 15 | 4 |
| 6 | 2 | 16 | 4 |
| 7 | 2 | 17 | 4 |
| 8 | 2 | 18 | 4 |
| 9 | 2 | | |

The final output of a nine-bit number giving a range of −256 to +255. If no scaling is done (shift 0 places), the maximum output value is about 70% of full scale, making an overflow or underflow condition impossible to occur. However with the scaling, it is easily possible to obtain either of these conditions, which will result in an erroneous output. To prevent this, a limiter circuit 56 is used to detect an overflow or underflow and limit it, or round it off, so that an overflow will appear as a +255 at the output and an underflow will appear as a −256 at the output.

Background information on discrete cosine transforms is described by J. Speiser, "High Speed Serial Access Implementation for Discrete Cosine Transforms," ARPA QR3, Oct. 1973, Appendix B, Order #2303, Code #3G10; and by D. Buss, et al, "Charge Transform Device Development," ARPA QR6 Part B, Jan. 1976, p. 1, Order #2303, Code #3G10, NUC S.D. 92,132.

Reference is now directed to FIG. 4, wherein is shown the next stage of the image-compression system 10, namely, a forward discrete pulse code modulator 60. These types of modulators are described by A. Habibi, "Hybrid Coding of Pictorial Data," ARPA QR2 June 1, 1973, Appendix B, Order #2303, Code #3G10, published by the Naval Undersea Center, S.D. 92,132 and by R. Means, et al., "Television Encoding Using a Hybrid Discrete Cosine Transform and a Differential Pulse Code Modulator in Real Time," IEEE 1974 National Telecommunications Conference Record, pp. NTC74-61 to 66-NTC74.

The transform coefficients are clocked out of the output buffer 58, of FIG. 3, at a 1.2 MHz rate and proceed through the forward differential pulse code modulator 40 at this rate.

The discrete pulse code modulator 60 comprises a first means 62 for summing, one of the whose two inputs accepts digital numbers. A first means for limiting 64, whose input is connected to the output of the summing means 62, ensures that the digital numbers are within a prescribed value, that is, limited to a pre-determined number of bits.

A means 66 for forward quantizing, whose input is connected to the first means for limiting 64, quantizes the coefficients of the input signal into K-bit code words. The means 66 may be a programmable read-only memory.

A means 68, which also may be a programmable read-only memory, generates a digital word, for specifying the number of bits assigned to the coefficients which the code words represent.

Means 72, having as inputs the outputs of the forward quantizing means 66 and the bit specifying, or assigning, means 68, inversely quantizes the forwardly quantized word.

A second means for summing 74 has as one of its two inputs the output of the inversely quantizing means 72.

A second means for limiting 76 whose input is connected to the output of the second summing means 74, limits the absolute value of the output so that it is always less than the absolute value of the input value.

A first storing means 78 whose input is connected to the output of the second limiting means 76, stores the digital words. The storing means 78 may be a 32-stage shift register memory.

A means 82, whose input is connected to the output of the first storing means 78, and whose output is connected to the first and second summing means, 62 and 74, feeds back part of its output signal to these stages.

A second means 84, whose two inputs comprise the outputs from the forward quantizing means 66 and the bit assignment, or specifying, means 68, stores the digital words received from its two inputs. This second storing means 84 is a first-in first-out (FIFO) memory. A means 86, whose input is connected to the output of the second storing means 84, converts the input digital word in serial form into a digital word in parallel form. As may be seen in the figure, the converter 86 has a bit stream output of 1600, 800, 400 or 200 kilobits per second.

Discussing the theory of the operation of the modulator 60 of FIG. 4, the previous line's reconstructed coefficients are stored in 9 thirty-two bit shift registers 78. These values are multiplied by the feedback coefficient in feedback multiplier 82, which for practical values, can be either 0.9375 (15/16), 0.875 ($\frac{7}{8}$), or 0.75 ($\frac{3}{4}$), the value not being critical. The multiplication is done by shifting the stored value either 4, 3, or 2 places and subtracting it from the value itself. This is done in such a way, by first limiter 64, that the absolute value of the result is always less than the absolute value of the input value unless the input is zero, in which case the result is also zero. The 9-bit feedback number is then subtracted from the 9-bit input number, in first summing means 62, with the result being limited to 6 bits, as indicated at the output of limiter 64. Since the two 9-bit numbers will usually not differ by very much, 6 bits is normally enough to describe the difference. The limiter 64 is used however to guard against an overflow or underflow condition. This guarantees that the output will be between −32 and +32 inclusive.

The six-bit difference now becomes the input to the forward quantizer PROM 66. The variances for all coefficients are relatively constant because of the scaling done by scaling means 54, at the output of the DCT (40 of FIG. 3). The output is a five-bit code word representing the quantized input. This code word together with a word specifying the number of bits assigned to this coefficient, by the bit assigning PROM 68, are the input to the inverse quantizer PROM 72. The output of this PROM 72 is a six-bit value that can be between −32 and +31.

However, since the output value is quantized, it can only take on a finite number of levels, the number of levels being determined by the number of bits assigned to that particular coefficient. The quantization levels are chosen so that the probability of a coefficient falling in any one level is approximately equal. These six bits are added, in second summing means 74, to the nine-bit feedback number, from feedback multiplier 82, with the result limited, by second limiter 76, to being a nine-bit number. This reconstructed number is then stored in the shift register memory 78.

TABLE 1-2 shows the output code words from the forward quantizer 66 and the quantized output from the inverse quantizer 72 as a function of the number of bits assigned to the coefficient. The table only includes the positive values since the negative values are identical except for the sign.

TABLE 1-2.

| Quantization Values | | | | | | |
|---|---|---|---|---|---|---|
| Forward Quantizer Input | 5-Bit Code Words | Inverse Quantizer Output | | | | |
| | | 5 Bits | 4 Bits | 3 Bits | 2 Bits | 1 Bit |
| 0 | 00000 | 0 | 1 | 2 | 4 | 8 |
| 1 | 00001 | 1 | 1 | 2 | 4 | 8 |
| 2 | 00010 | 2 | 3 | 2 | 4 | 8 |
| 3 | 00011 | 3 | 3 | 2 | 4 | 8 |
| 4 | 00100 | 4 | 5 | 6 | 4 | 8 |
| 5 | 00101 | 5 | 5 | 6 | 4 | 8 |
| 6 | 00110 | 6 | 7 | 6 | 4 | 8 |
| 7 | 00111 | 7 | 7 | 6 | 4 | 8 |
| 8 | 01000 | 9 | 10 | 12 | 17 | 8 |
| 9 | 01000 | 9 | 10 | 12 | 17 | 8 |
| 10 | 01001 | 11 | 10 | 12 | 17 | 8 |
| 11 | 01001 | 11 | 10 | 12 | 17 | 8 |
| 12 | 01010 | 13 | 14 | 12 | 17 | 8 |
| 13 | 01010 | 13 | 14 | 12 | 17 | 8 |
| 14 | 01011 | 15 | 14 | 12 | 17 | 8 |
| 15 | 01011 | 15 | 14 | 12 | 17 | 8 |
| 16 | 01011 | 15 | 14 | 12 | 17 | 8 |
| 17 | 01100 | 18 | 20 | 24 | 17 | 8 |
| 18 | 01100 | 18 | 20 | 24 | 17 | 8 |
| 19 | 01100 | 18 | 20 | 24 | 17 | 8 |
| 20 | 01101 | 22 | 20 | 24 | 17 | 8 |
| 21 | 01101 | 22 | 20 | 24 | 17 | 8 |
| 22 | 01101 | 22 | 20 | 24 | 17 | 8 |
| 23 | 01101 | 22 | 20 | 24 | 17 | 8 |
| 24 | 01110 | 27 | 29 | 24 | 17 | 8 |
| 25 | 01110 | 27 | 29 | 24 | 17 | 8 |
| 26 | 01110 | 27 | 29 | 24 | 17 | 8 |
| 27 | 01110 | 27 | 29 | 24 | 17 | 8 |
| 28 | 01110 | 27 | 29 | 24 | 17 | 8 |
| 29 | 01111 | 31 | 29 | 24 | 17 | 8 |
| 30 | 01111 | 31 | 29 | 24 | 17 | 8 |
| 31 | 01111 | 31 | 29 | 24 | 17 | 8 |

The five-bit code word from the forward quantizer 66 and the three bits specifying the number of bits for this coefficient from PROM 68, are also clocked into a first-in first-out (FIFO) memory 84. The code words contain the bits that will be sent to the ground receiver. During the next line time, they are clocked out of the FIFO memory 84 and into the parallel-in serial-out shift register 86. Depending on the value of the three-bit number, anywhere from all five bits to only the sign bit will be clocked out of the shift register 86. The output of this register 86 is a serial bit stream at 1600, 800, 400 or 200 kilobits per second. The highest quality picture is desired, so the highest data rate 1600, is chosen first. When jamming becomes excessive, the next lower rate is chosen, etc., to provide optimum anti-jamming protection.

Referring now to FIG. 5, therein is shown an apparatus 90 for receiving a differential pulse-code modulated digital signal in serial form. The signal represents video information comprising frames in a rectangular format, each frame including M parallel vertical stripes, each stripe comprising N scanned lines.

Means 92 are provided for converting the input signal in serial form into an output digital signal in parallel form.

Means 94, whose input is connected to the output of the converting means 92, demodulates, or decodes, the differential pulse-code modulated signal. The means 94 is generally referred to as an inverse differential pulse code modulator, or $(DPCM)^{-1}$.

A means 96, whose input is connected to the output of the decoding means 94, generates the inverse digital cosine transform of the signal at its input.

A means 98, comprises a frame store memory (FSM) 98M, an input FSM interface 98I-I and an output FSM interface 98I-O. The FSM input interface 98I-I is connected to the output of the decoding means 94. The frame store memory 98M stores the video data and information as to the line and stripe in which current data is stored.

A means 102, whose input is connected to the output of the storing means 98M, converts the digital data in the storing means into analog data.

A timer 104 times all circuits in the receiver.

The receiving apparatus 90 would generally further comprise a means, for example TV monitor 106, whose input is connected to the data converting means 102, for displaying the analog data.

The receiver 90, generally a ground unit, shown in FIG. 5, is used to reconstruct the picture received from the transmitter 10, shown in FIG. 1. It consists of three basic sections: the inverse DPCM 94, the inverse DCT 96, and the frame store memory 98M. A receiver timer 104 times all circuits.

Referring now to FIG. 6, the inverse DPCM 110 consists of two subsections: the serial-to-parallel interface 92 and the DPCM reconstruction loop. The serial-to-parallel interface 92 receives the bit stream from the channel, and through the use of a serial-in parallel-out shift reigster, which may be assumed to be part of converter 92, converts the bits into code words from one to five bits long. Control of the register in converter 92 is by a PROM 112 containing the bit assignments for the four data rates.

The code words are clocked from the shift register into a FIFO memory 114. During the next line time these words are read out of the FIFO memory 114 at the 1.2 MHz rate. The one to five bit codes, from converter 92, together with the three bits specifying the number of bits, from PROM 112, become the input to the inverse quantizer PROM 116.

The output of this PROM 116 is a six-bit 2's complement number. As in the forward DPCM, 60 of FIG. 4, the number of allowable output values is determined by the number of bits assigned to this coefficient. The reconstruction loop of the inverse DPCM 110 is identical to the one in the forward DPCM, 60 of FIG. 4. The previous line's reconstructed frequency coefficients are stored in nine 32-stage shift register memories 124.

These numbers pass through the feedback coefficient multiplier 126 with the output being the input times 0.9375, 0.875, or 0.75. These feedback numbers also have the property that except for an input of zero the absolute value of the output is less than the absolute value of the input. The reason for having the multiplier 126 work in this manner is that it insures that both the transmitter and the receiver loops will be decaying towards zero. Without this multiplier property, the receiver loop will decay towards the smallest value which can go into the feedback multiplier 126 and come out unchanged.

The nine-bit feedback number from multiplier 126 is added to the six-bit inverse quantizer 116 number giving a ten-bit result. This is limited to a nine-bit number from −256 to +255 and stored in the shift register 124. These nine-bit numbers are the reconstructed frequency coefficients.

At this point, a set of shifters, in scaling circuit 128, is used for scaling to make the higher frequency coefficients larger at the output. Some scaling has already been done in the forward DCT, 40 of FIG. 3, but the additional scaling at the inverse DPCM 110 output is desirable. The reason is that the scaling in the forward DCT, 40 of FIG. 3, produces a white spectrum for the "coefficient differences" in the forward DPCM 60 (of FIG. 4) loop.

The inverse DCT 140, shown in FIG. 6, operates best with the coefficients themselves approximately white. The nine-bit number is multiplied, in scaling circuit 128, by 1, 2, 4, or 8 shifting it 0, 1, 2, or 3 places, rounding it and then limiting it in circuit 132, to a six-bit number between −32 and +31. The scaling is listed in TABLE 1-3.

TABLE 1-3.

| | Inverse DPCM Output Scaling | | |
|---|---|---|---|
| Coef. No. | Scaling | Coef. No. | Scaling |
| 0 | 1 | 10 | 4 |
| 1 | 2 | 11 | 4 |
| 2 | 2 | 12 | 4 |
| 3 | 2 | 13 | 4 |
| 4 | 4 | 14 | 4 |
| 5 | 2 | 15 | 4 |
| 6 | 2 | 16 | 4 |
| 7 | 4 | 17 | 4 |
| 8 | 4 | 18 | 4 |
| 9 | 4 | | |

As these numbers are placed on the output they are clocked into an input buffer 142, FIG. 7, of the inverse DCT circuit 140.

The inverse cosine transform circuit 140, FIG. 7, is essentially identical to the forward cosine transform circuit 40, FIG. 3. The major difference is that the forward unit 40 takes 32 pixel brightness numbers and computes 19 transform coefficients while the inverse unit 140, FIG. 7, takes 19 frequency coefficients and computes 32 pixel brightness numbers.

As in the forward DCT circuit 40, FIG. 3, a matrix multiply algorithm is used. The basis vectors stored in the PROM 144, FIG. 7, are the same as before but they are referenced in a different order. After multiplying the appropriate frequency coefficient and basis vectors together in multiplier 146, the result is scaled in scaling circuit 148 to adjust for the effect of the previous whitening filters. As before, the scaling is done by shifting 0, 1, 2, or 3 places, but now in the opposite direction, so that the result has been divided by 1, 2, 4, or 8. The scale factors are listed in TABLE 1-4.

TABLE 1-4.

| | Inverse Cosine Transform Scaling | | |
|---|---|---|---|
| Coef. No. | Scaling | Coef. No. | Scaling |
| 0 | 1 | 10 | 4 |
| 1 | 1 | 11 | 4 |
| 2 | 1 | 12 | 8 |
| 3 | 1 | 13 | 8 |
| 4 | 2 | 14 | 8 |
| 5 | 2 | 15 | 8 |

TABLE 1-4.-continued

| | Inverse Cosine Transform Scaling | | |
|---|---|---|---|
| Coef. No. | Scaling | Coef. No. | Scaling |
| 6 | 2 | 16 | 8 |
| 7 | 4 | 17 | 8 |
| 8 | 4 | 18 | 8 |
| 9 | 4 | | |

These scaled products are accumulated in register 156. When all 19 products for one pixel have been accumulated in accumulator 156, the result is limited to a six-bit number by limiter and rounder 158, and stored in output buffer 159. The numbers represent the reconstructed brightness levels of the 32 pixels in the current line of the current strip, −32 representing the darkest level and +31 representing the lightest.

These 32 numbers are transferred from the inverse DCT circuit 140, FIG. 7, to the frame store memory interface buffer, 98I-I of FIG. 5, at the 1.2 MHz rate. The frame store memory interface 98I-O keeps track of the line and stripe in which the current data is to be stored. During the horizontal retrace time, the 32 six-bit numbers are stored in the frame store memory 98M. The FSM interface 98I-O also reads the data out of the FSM 98M at the correct time and rate to display it on a TV monitor 106.

The data being output is converted to an analog signal by D/A converter 102, and then combined with the necessary sync and blanking signals to produce a video signal to drive the monitor 106.

The normal operating procedure for the system has been described above. Since it obviously takes more than one line time (65 microseconds) to go from analog video data through the system, comprising the transmitter 10 and receiver 90, and onto the display 106, the system relies on pipelining the data through the various components. Summarized below is a description of the operations taking place during line N as a set of data moves through the system.

1. The video data is sampled (line N), digitized in A/D converter 14, FIG. 1, and stored at 4.8 MHz in input buffer 42, FIG. 3.

2. The pixel values (line N-1) are transferred to DCT circuit 40, FIG. 3, at 1.2 MHz and stored in accumulator 52.

3. DCT circuit 40, FIG. 3, calculates 19 coefficients (line N-2), scales, in scaling means 54, and stores in output buffer 58.

4. The coefficients pass through DPCM 60, FIG. 4, (line N-3), code words pass into FIFO 84.

5. The code words out of FIFO 84 (line N-4) are changed to serial bit stream by converter 86, sent over data channel. Serial-to-parallel conversion takes place in circuit 92, FIG. 5, and the data is stored in FIFO 114, FIG. 6.

6. From FIFO 114 (line N-5), the data passes through inverse DPCM 110, scaling is done at output by scaling circuit 128, the data then being stored in inverse DCT input buffer 142, FIG. 7.

7. The inverse DCT circuit 140 calculates 32 pixel values (line N-6), stores them in output buffer 159.

8. The pixel values (line N-7) are transferred to FSM interface buffer 98I-I, ready to be stored in FSM 98M, FIG. 5.

9. Line N-8 is displayed from FSM 98M.

The system can be run with the DPCM's 18 of FIG. 1 and 94 of FIG. 5, out of the process in order to demonstrate the effect of the DCT's 16 of FIG. 1 and 96 of FIG. 5, alone. In this case, the output of the forward DCT 16 of FIG. 1 is fed to the output scaling circuitry 128 of FIG. 6 of the inverse DPCM 110 in order to be scaled properly, but the data does not go through either DPCM loop 82 of FIG. 4 or 126 of FIG. 6.

For this configuration the system operates as follows:

1. Video data sampled (line N), digitized in A/D converter 14, FIG. 1, and stored at 4.8 MHz in input buffer 42, FIG. 3.

2. Pixel values (line N-1) transferred to DCT circuit 40, FIG. 3 at 1.2 MHz and stored in accumulator 52.

3. The DCT circuit 40 calculates 19 coefficients (line N-2) scales in scaling means 54, and stores in output buffer 58.

4. The coefficients (line N-3) pass through inverse DPCM output scaling circuit 128, FIG. 6, and are stored in inverse DCT input buffer 142, FIG. 7.

5. The inverse DCT circuit 140 calculates 32 pixel values (line N-4) and stores them in output buffer 159.

6. The pixel values (line N-5) are transferred to FSM interface buffer 98I-I, ready to be stored in the FSM 98M.

7. Line N-6 displayed on monitor 106.

The system, comprising the transmitter 10 of FIG. 1 and the receiver 90 of FIG. 5, can also be run without the DCT circuit or DPCM, forward or inverse, demonstrating only the effects of the reduced frame rate and reduced resolution. In this configuration, summarized below, the output of the A/D converter 14, of FIG. 1, is fed directly to the frame store memory interface 98I-I of FIG. 5.

1. Video data sampled (line N), digitized, by A/D converter 14, FIG. 1, and stored at 4.8 MHz in input buffer 42 of FIG. 3.

2. Pixel values (line N-1) transferred to FSM interface buffer 98I-I, ready to be stored in FSM 98M.

3. Line N-2 displayed on video monitor 106.

Obviously, many modifications and variations of the present invention are possible in the light of the above teachings, and, it is therefore understood that within the scope of the disclosed inventive concept, the invention may be practiced otherwise than as specifically described.

FIGS. 8-11 show specific board system interconnections. The boards which were used had the specific lettering for the various connections as shown, for example A10, B8, etc.

More specifically, FIG. 8 shows the system interconnections 160 for the A/D converter 14, DCT device 16, and the discrete pulse code modulator 18, all of FIG. 1. This figure shows the transmitter, that is, air, interconnections.

FIG. 9 shows the system interconnections 200 for the receiver, which is ground based. The interconnections for the inverse discrete pulse code modulator, 94 of FIG. 5, are shown in two sections. The inverse discrete cosine transform interconnections relate to the device 96, shown in FIG. 5.

FIG. 10 shows the system interconnections 240 for the frame store memory 98, shown in FIG. 5. Connections with the inverse discrete cosine transformer to FIG. 9 are also shown.

FIG. 11 shows the timing system interconnections 280, to the transmitter 10, of FIG. 1 and to the receiver 90, of FIG. 5.

What is claimed is:

1. A digital image-compression system, comprising a transmitter and a receiver, wherein the image consists of a planar array of data points having various brightness levels, the transmitter comprising:
   means for converting input analog data into digital data;
   means, whose input is connected to the output of the analog-to-digital (A/D) converting means, for taking the cosine transform of the incoming digital data, to transform the data representing the various brightness levels into the frequency domain; and
   means, whose input is connected to the output of the cosine transform means, for differentially pulse code modulating (DPCM) the input data, thereby removing line-to-line redundancy, the output data being in parallel form; and
   means, connected to each of the three means, for controlling the timing of the three means.

2. The image-compression system according to claim 1, wherein the means for taking the cosine transform comprises:
   input means for storing digital words;
   means for generating basis vectors;
   means for multiplying, having as inputs the outputs of the means for storing and of the means for generating;
   means for summing, having two inputs, one input being the output of the multiplying means;
   means, whose input is connected to the output of the summing means, for accumulating a series of digital numbers, the output of the accumulating means forming the second input to the summing means;
   means, whose input is connected to the output of the accumulating means, for scaling the values of some of the digital numbers;
   means, whose input is connected to the output of the scaling means, for limiting the values of the input digital numbers; and
   output means, whose input is connected to the output of the limiting means, for storing the resultant transformed digital numbers.

3. The image-compression system according to claim 2 wherein the means for differentially pulse-code modulating the input data comprises:
   first means for summing, one of whose two inputs accepts digital numbers;
   first means for limiting, whose input is connected to the output of the summing means, which ensures that the digital numbers are within a prescribed value, limited to a predetermined number of bits;
   a means for forward quantizing, whose input is connected to the means for limiting, which quantizes the coefficients of the input signal into K-bit code words;
   means generating a digital word for specifying the number of bits assigned to the coefficients which the code words represent;
   means, having as inputs the outputs of the forward quantizing means and the specifying means, for inversely quantizing the forwardly quantized word;
   second means for summing, one of whose two inputs comprises the output of the inversely quantizing means;
   second means for limiting, whose input is connected to the output of the second summing means, which limits the absolute value of the output so that it is always less than the absolute value of the input value;

first means, whose input is connected to the output of the second limiting means, for storing the digital words;

means, whose input is connected to the output of the storing means, and whose output is connected to the first and second summing means, for feeding back part of the output signal to the inputs;

second means, whose two inputs comprise the outputs from the forward quantizing means and the specifying means, for storing digital words received from its two inputs; and means, whose input is connected to the output of the second storing means, for converting the input digital word in serial form into a digital word in parallel form.

4. The image-compression system according to claim 1, wherein the means for differentially pulse-code modulating the input data comprises:

first means for summing, one of whose two inputs accepts digital numbers;

first means for limiting, whose input is connected to the output of the summing means, which ensures that the digital numbers are within a prescribed value, limited to a predetermined number of bits;

a means for forward quantizing, whose input is connected to the means for limiting, which quantizes the coefficients of the input signal into K-bit code words;

means generating a digital word for specifying the number of bits assigned to the coefficients which the code words represent;

means, having as inputs the outputs of the forward quantizing means and the specifying means, for inversely quantizing the forwardly quantized word;

second means for summing, one of whose two inputs comprises the output of the inversely quantizing means;

second means for limiting, whose input is connected to the input of the second summing means, which limits the absolute value of the output so that it is always less than the absolute value of the input value;

first means, whose input is connected to the output of the second limiting means, for storing the digital words;

means, whose input is connected to the output of the storing means, and whose output is connected to the first and second summing means, for feeding back part of the output signal to the inputs;

second means, whose two inputs comprise the outputs from the forward quantizing means and the specifying means, for storing digital words received from its two inputs; and means, whose input is connected to the output of the second storing means, for converting the input digital word in serial form into a digital word in parallel form.

5. The image-compression system according to claim 1, further comprising:

a video camera which scans the image data, comprising the planar array of points, which is to be compressed, the output of the camera comprising the analog data to the A/D converting means.

6. The image-compression system according to claim 5, further comprising:

means, whose input is connected to the output of the DPCM means, for converting the parallel output data into serial output data, this means also timed by the timing means.

7. The image-compression data according to claim 6, wherein:

the planar array comprises a rectangular array comprising M parallel vertical stripes, each stripe comprising N lines; and wherein;

the video camera is capable of scanning each stripe, line by line, as in a conventional television scanning system, each stripe being scanned in succession.

8. Apparatus for taking the cosine transform of a digital signal, comprising:

input means for storing digital data:

means for generating basis vectors;

means for multiplying, having as inputs the outputs of the means for storing and of the means for generating basis vectors;

means for summing, having two inputs, one input being the output of the multiplying means;

means, whose input is connected to the output of the summing means, for accumulating a series of digital numbers, the output of the accumulating means forming the second input to the summing means;

means, whose input is connected to the output of the accumulating means, for scaling the values of some of the digital numbers;

means, whose input is connected to the output of the scaling means, for limiting the values of the input digital numbers; and output means, whose input is connected to the output of the limiting means, for storing the resultant transformed digital numbers.

9. The apparatus according to claim 8, wherein:

the means for generating basis vectors is a programmable read-only memory (PROM); and wherein:

the scaling means comprises a programmable read-only memory; and wherein:

the limiting means comprises a means for rounding off the digital numbers within a prescribed range.

10. A discrete pulse code modulator comprising:

first means for summing, one of whose two inputs accepts digital numbers;

first means for limiting, whose input is connected to the output of the summing means, which ensures that the digital numbers are within a prescribed value, limited to a predetermined number of bits;

a means for forward quantizing, whose input is connected to the means for limiting, which quantizes the coefficients of the input signal into K-bit code words;

means generating a digital word for specifying the number of bits assigned to the coefficients which the code words represent;

means, having as inputs the outputs of the forward quantizing means and the specifying means, for inversely quantizing the forwardly quantized word;

second means for summing, one of whose two inputs comprises the output of the inversely quantizing means;

second means for limiting, whose input is connected to the output of the second summing means, which limits the absolute value of the output so that it is always less than the absolute value of the input value;

first means, whose input is connected to the output of the second limiting means, for storing the digital words;

means, whose input is connected to the output of the storing means, and whose output is connected to the first and second summing means, for feeding back part of the output signal to the inputs;

second means, whose two inputs comprise the outputs from the forward quantizing means and the specifying means, for storing digital words received from its two inputs; and means, whose input is connected to the output of the second storing means, for converting the input digital word in serial form into a digital word in parallel form.

11. Apparatus for receiving a differential pulse-code-modulated digital signal in serial form, the signal representing video information comprising frames in a rectangular format, each frame including M parallel vertical stripes, each stripe comprising N scanned lines, the apparatus comprising:

means for converting the input signal in serial form into an output parallel digital signal;

means, whose input is connected to the output of the converting means, for demodulating, or decoding, the differential pulse-code-modulated signal;

means, whose input is connected to the output of the decoding means, for generating the inverse digital cosine transform of the signal at its input;

means, whose input is connected to the output of the decoding means for storing the video data and information as to the line and stripe in which current data is stored;

means, whose input is connected to the output of the storing means, for converting the digital data in the storing means into analog data; and means for timing all said means.

12. The receiving apparatus according to claim 11, further comprising:

means, whose input is connected to the data converting means, for displaying the analog data.

* * * * *